(12) United States Patent
Ma et al.

(10) Patent No.: US 9,327,474 B2
(45) Date of Patent: May 3, 2016

(54) DISPLAY DEVICE AND METHODS FOR PRODUCING THE SAME

(71) Applicant: EverDisplay Optronics (Shanghai) Limited, Shanghai (CN)

(72) Inventors: Kunliang Ma, Shanghai (CN); Chih-Wei Wen, Shanghai (CN)

(73) Assignee: EverDisplay Optronics (Shanghai) Ltd., Shanghai (CN)

( * ) Notice: Subject to any disclaimer, the term of this patent is extended or adjusted under 35 U.S.C. 154(b) by 0 days.

(21) Appl. No.: 14/603,149

(22) Filed: Jan. 22, 2015

(65) Prior Publication Data

US 2016/0075106 A1   Mar. 17, 2016

(30) Foreign Application Priority Data

Sep. 17, 2014  (CN) .............................. 201410476119

(51) Int. Cl.
*B32B 7/12* (2006.01)
*F21K 2/00* (2006.01)
*B32B 37/12* (2006.01)
*B32B 37/14* (2006.01)

(52) U.S. Cl.
CPC . *B32B 7/12* (2013.01); *B32B 37/12* (2013.01); *B32B 37/14* (2013.01); *F21K 2/00* (2013.01); *B32B 2255/20* (2013.01); *B32B 2255/28* (2013.01); *B32B 2307/422* (2013.01); *B32B 2457/20* (2013.01)

(58) Field of Classification Search
CPC .......... B32B 7/12; B32B 37/12; B32B 37/14; B32B 2255/28; B32B 2457/20; B32B 2255/20; B32B 2307/422; F21K 2/00
See application file for complete search history.

(56) References Cited

U.S. PATENT DOCUMENTS

| | | | | |
|---|---|---|---|---|
| 2007/0275253 A1* | 11/2007 | Thiel | ....................... | B32B 17/06 428/432 |
| 2009/0237586 A1* | 9/2009 | Han | ................... | G02F 1/133308 349/58 |
| 2010/0215976 A1* | 8/2010 | Suwa | ....................... | B32B 27/30 428/522 |
| 2011/0033720 A1* | 2/2011 | Fujita | .......................... | C09J 7/00 428/522 |
| 2014/0211447 A1* | 7/2014 | Harding | .................. | G02C 7/104 362/84 |

* cited by examiner

*Primary Examiner* — Betelhem Shewareged
(74) *Attorney, Agent, or Firm* — Wang Law Firm, Inc.

(57) ABSTRACT

A display device includes a bonding layer between a display module and a cover. An ink layer and a fluorescent layer are disposed between the cover and the bonding layer. A method for producing a display device includes applying a fluorescent layer on at least one end of a cover; applying an ink layer on the fluorescent layer, with the ink layer not contacting the cover; forming a bonding layer on the ink layer and the cover; and coupling a display module to the cover via the bonding layer. In another approach, a method includes applying an ink layer on at least one end of a cover; applying a fluorescent layer on the cover at a location other than the ink layer; forming a bonding layer on the ink layer, the fluorescent layer, and the cover; and coupling a display module to the cover via the bonding layer.

16 Claims, 2 Drawing Sheets

DISPLAY DEVICE AND METHODS FOR PRODUCING THE SAME

BACKGROUND OF THE INVENTION

The present invention relates to the field of display devices and, more particularly, to a display device and methods for producing the display device.

Current display devices, particularly display devices with touch control functions, have several types including one glass solution (OGS) structure (an integral touch control structure), glass-film-film (GFF) structure (a film type structure with a protective glass), glass-film (GF) structure, In-cell structure (the display screen is embedded with a touch sensor function), and On-cell structure (the touch screen is inserted between the substrate of the color filter of the display screen and the polarizer). In the above structures, an ink is provided on a rear face of the touch control panel or the cover glass for providing insulation, acid resistance, a moisture-proof effect, and protection. There are more and more types of inks, and the inks are more and more reliable.

Current designs of display devices direct to novel and fashion styles. Every manufacturer focuses on the improvement to the colors of the electronic products in the market with vigorous competition. The color of a display device is presented by the ink. However, current inks are either black or white, which is monotonous and in a disadvantageous position in competition.

BRIEF SUMMARY OF THE INVENTION

The present invention provides a display device and methods for producing the display device to solve the disadvantage of color monotonousness and disadvantageous competitive position of display devices.

In a first aspect, a display device includes a display module, a cover, and a bonding layer between the display module and the cover. An ink layer and a fluorescent layer are disposed on at least a portion between the cover and the bonding layer.

At least an end of the cover can overlap with the ink layer and the fluorescent layer.

In an example, the fluorescent layer is disposed between the at least one portion of the cover and the ink layer. The total thickness of the ink layer and the fluorescent layer is 5-7 μm.

In another example, the ink layer is disposed on a first portion of the cover, the fluorescent layer is disposed on a second portion of the cover, and the first portion is different from the second portion. Each of the ink layer and the fluorescent layer has a thickness of 5-7 μm.

In an example, the display module includes a first indium tin oxide film, a second indium tin oxide film, and a module bonding layer. The module bonding layer is disposed between the first indium tin oxide film and the second indium tin oxide.

In a second aspect, a method for producing a display device includes:
 applying a fluorescent layer on at least one end of a cover;
 applying an ink layer on the fluorescent layer, with the ink layer not contacting the cover;
 forming a bonding layer on the ink layer and the cover; and
 providing a display module, with the display module coupled to the cover via the bonding layer.

In an example, the total thickness of the ink layer and the fluorescent layer is 5-7 μm.

In another example, a thickness of each of the ink layer and the fluorescent layer is 5-7 μm.

In a third aspect, a method for producing a display device includes:
 applying an ink layer on at least one end of a cover;
 applying a fluorescent layer on the cover at a location other than the ink layer;
 forming a bonding layer on the ink layer, the fluorescent layer, and the cover; and
 providing a display module, with the display module coupled to the cover via the bonding layer.

In an example, a thickness of each of the ink layer and the fluorescent layer is 5-7 nm.

The present invention will become clearer in light of the following detailed description of illustrative embodiments of this invention described in connection with the drawings.

DETAILED DESCRIPTION OF THE INVENTION

Figure 1:
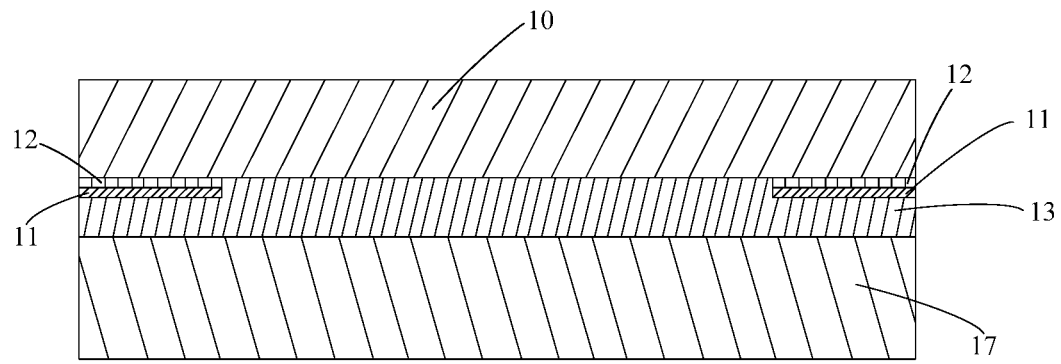
FIG. 1 is a diagrammatic cross sectional view of a display device of a first embodiment according to the present invention.

FIG. 1 is a diagrammatic cross sectional view of a display device of a first embodiment according to the present invention. The display device includes a display module, a cover 10, and a bonding layer 13 between the display module and the cover 10. An ink layer 11 and a fluorescent layer 12 are disposed on at least a portion between the cover 10 and the bonding layer 13. By provision of the fluorescent layer 12, the display device can emit light rays at night. Furthermore, the colors and lumiance of the light rays can be controlled to present different colors at night, providing a colorful effect. This provides a colorful appearance for the display device in the competitive market, increasing the visual effect for the user.

The display device according to the present invention can be an OGS structure, a GFF structure, a GF structure, an In-cell structure, or an On-cell structure. The thickness of the ink layer 11 and the fluorescent layer 12 is 5-7 μm and can be as thin as 5 μm, effectively reducing the level difference of the ink layer 11. No bubbles are generated when using an optically clear adhesive for bonding purposes, nor a thick optically clear adhesive is required. In practice, an optically clear adhesive layer with a thickness of only 50 μm is sufficient to perform bonding between structural layers, which is significantly thinner than current optically clear adhesives of 200 μm. Thus, the overall thickness of the display device is reduced accordingly. The display device and the methods for producing the display device according to the present invention will now be set forth in connection with the accompanying drawings.

With reference to FIG. 1, the display device according to the present invention includes a display module, a cover 10, and a bonding layer 13 between the display module and the cover 10. An ink layer 11 and a fluorescent layer 12 are disposed on at least a portion between the cover 10 and the bonding layer 13. Preferably, the ink layer 11 and the fluorescent layer 12 are disposed on an end of the cover 10 and extend annularly to form a space on the cover 10. When the cover 10 is bonded to the display module, the space is filled by the bonding layer 13. The bonding layer 13 uses an optically clear adhesive. In this embodiment, the display module is a display panel 17 that can be an In-cell panel (in which the touch control screen is mounted inside the display structure) or an On-cell panel (in which the touch control screen is mounted on the surface of the display structure). A polarizer can be mounted on the touch control screen. The cover 10 can be a cover glass, a PMMA (polymethyl methacrylate) glass, or a lens.

In an example, the end of the cover 10 overlaps with the ink layer 11 and the fluorescent layer 12. Namely, the ink layer 11 is disposed between the fluorescent layer 12 and the cover 10, or the fluorescent layer 12 is disposed between the ink layer 11 and the cover 10. The total thickness of the ink layer 11 and the fluorescent layer 12 is 5-7 μm. The fluorescent layer 12 disposed on the ink layer 11 is formed by fluorescent powder. The light rays emitted by the fluorescent layer 12 transmit the cover 10, and the colors and luminances of light rays can be controlled. Thus, the fluorescent layer 12 can emit different colors at night to present a colorful effect. The fluorescent layer 12 is formed by printing fluorescent powder. The fluorescent powder stores optical energy when radiated with the natural light, fluorescent lamps, or ultraviolet light. After the light radiation is stopped, the optical energy is slowly released in the form of a fluorescent light. The fluorescent effect, which can last more than ten hours, can clearly be seen at night or in the dark. A novel appearance and a colorful effect at night can be obtained by printing the fluorescent layer 12 and the ink layer 11 on the structure of a touch control display device. By disposing the fluorescent layer 12 on a side of the ink layer 11, the light rays emitted by the fluorescent powder can directly transmit the cover 10 to the outside, maximizing the effect of the fluorescent powder and obtaining an obvious fluorescent effect.

In this embodiment, since the total thickness of the ink layer 11 and the fluorescent layer 12 is 5-7 μm, the level difference (i.e., the height of the space) between the cover 10 and both of the fluorescent layer 12 and the ink layer 11 is smaller when the bonding layer 13 bonds with the cover 10 and the display module. The thickness of the bonding layer 13 can be reduced, and bubbles will not be generated during bonding, assuring the quality of the display device and reducing the thickness of the display device.

Figure 2:
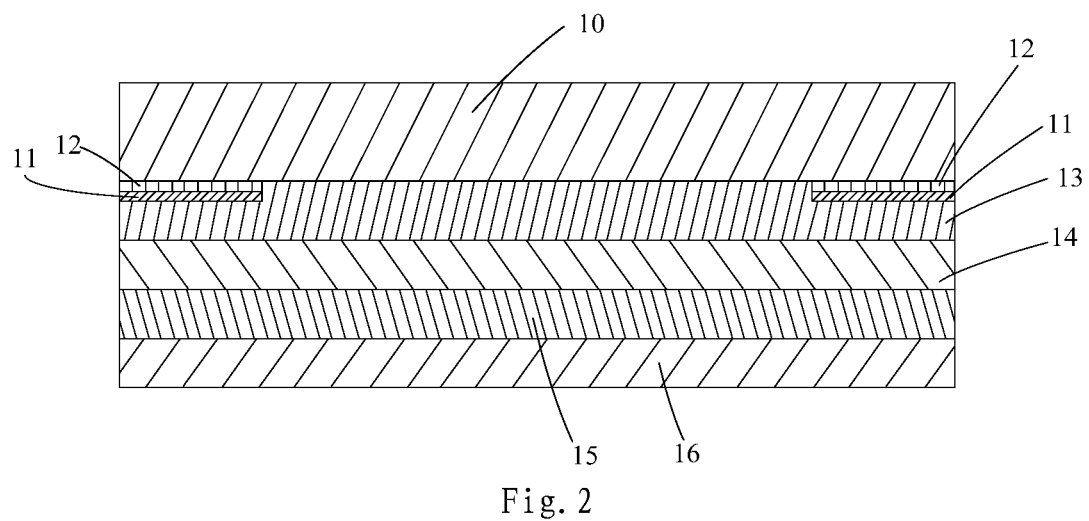
FIG. 2 is a diagrammatic cross sectional view of a display device of a second embodiment according to the present invention.

FIG. 2 shows a second embodiment according to the present invention. The second embodiment is different from the first embodiment by that the display module is in the form of a GFF structure (of course, the display module can be a GF structure). In the embodiment of GFF structure, the display module includes a first indium tin oxide film 16, a second indium tin oxide film 14, and a module bonding layer 15. The module bonding layer 15 is disposed between the first indium tin oxide film 16 and the second indium tin oxide 14 to bond the first indium tin oxide film 16 with the second indium tin oxide 14. The module bonding layer 15 uses an optically clear adhesive. The remaining structure is the same as the first embodiment and is, therefore, not described in detail to avoid redundancy.

Figure 3:
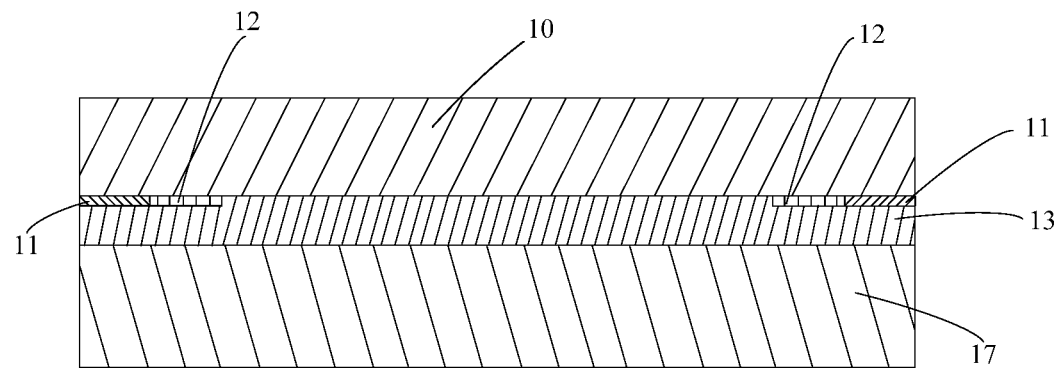
FIG. 3 is a diagrammatic cross sectional view of a display device of a third embodiment according to the present invention.

FIG. 3 is a diagrammatic cross sectional view of a display device of a third embodiment according to the present invention. In this embodiment, the ink layer 11 is disposed on a first portion of the cover 10, the fluorescent layer 12 is disposed on a second portion of the cover 10, and the first portion is different from the second portion. Preferably, the ink layer 11 and the fluorescent layer 12 are contiguous to each other and are bonded to form the same layer. The ink layer 11 and the fluorescent layer 12 extend annularly along an end of the cover 10. Each of the ink layer 11 and the fluorescent layer 12 has a thickness of 5-7 μm and is disposed on the cover 10 by printing. Layer 13 and display panel 17 have same characteristics as described above in the description of FIG. 1.

In a preferred example, fluorescent powder is evenly mixed an ink, and the mixture is printed on an end of the cover 10 to form a mixture layer of the ink and the fluorescent powder. Such a mixing provision is more flexible, and different ratios of the ink to the fluorescent powder can be provided according to needs to provide different luminances. Thus, both the color and the luminance can be controlled.

Figure 4:
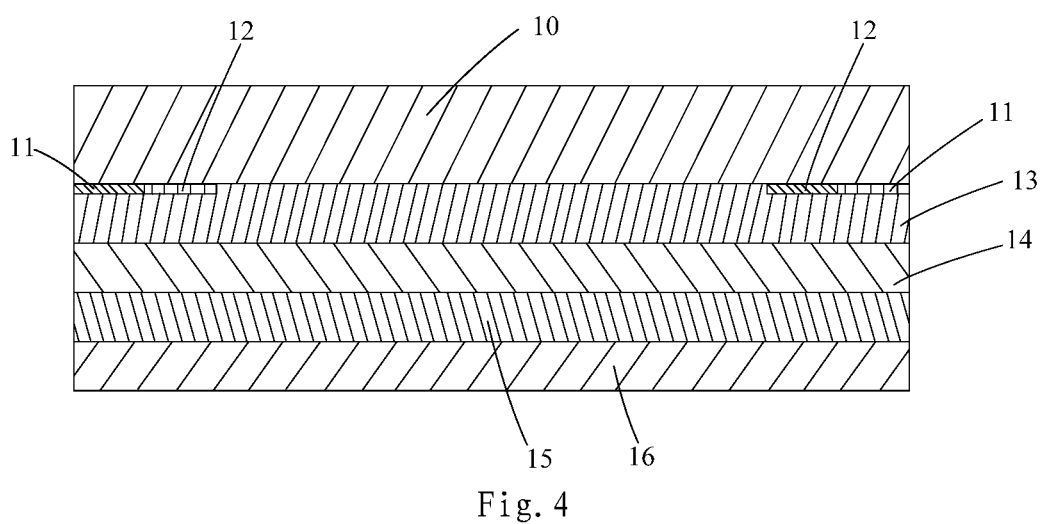
FIG. 4 is a diagrammatic cross sectional view of a display device of a fourth embodiment according to the present invention.

FIG. 4 shows a fourth embodiment according to the present invention. The fourth embodiment is different from the second embodiment by that the display module is in the form of a GFF structure (of course, the display module can be a GF structure). In the embodiment of GFF structure, the display module includes a first indium tin oxide film 16, a second indium tin oxide film 14, and a module bonding layer 15. The module bonding layer 15 is disposed between the first indium tin oxide film 16 and the second indium tin oxide 14 to bond the first indium tin oxide film 16 with the second indium tin oxide 14. The module bonding layer 15 uses an optically clear adhesive. The remaining structure is the same as the second embodiment and is, therefore, not described in detail to avoid redundancy.

The advantageous effects of the display device according to the present invention are that by adding fluorescent powder into the ink for printing purposes or by disposing the fluorescent layer 12 on the ink layer 11, the display device is provided with a novel appearance, and the colors can be different, providing colorful stimulation to people and increasing the fluorescent effect of the display device.

The total thickness of the ink layer 11 and the fluorescent layer 12 is 5-7 μm, greatly reducing the level difference of the ink layer 11. Bubbles are less likely to be generated during bonding. Thus, a thin bonding layer 13 can be used for bonding purposes. In practice, a bonding layer 13 with a thickness of only 50 μm is sufficient to perform bonding between structural layers without generating bubbles. Thus, the overall thickness of the display device is reduced accordingly to fulfill the demand of thinning and lighting of electronic products.

The methods for producing a display device will now be set forth. With reference to FIG. 1, in a first example for producing a display device, the method includes applying a fluorescent layer 12 on at least one end of a cover 10 by printing fluorescent powder on the at least one end of the cover 10. An ink is applied on the fluorescent layer 12 to form an ink layer 11. The ink layer 11 does not contact the cover 10. A bonding layer 13 is formed on the ink layer 11 and the cover 10. A display module is provided and is coupled to the cover 10 via the bonding layer 13. The bonding layer 13 uses an optically clear adhesive. The total thickness of the ink layer 11 and the fluorescent layer 12 is 5-7 μm. Alternatively, thickness of each of the ink layer 11 and the fluorescent layer 12 is 5-7 μm. In this embodiment, the display module is a display panel 17 that can be an In-cell panel (in which the touch control screen is mounted inside the display structure) or an On-cell panel (in which the touch control screen is mounted on the surface of the display structure). A polarizer can be mounted on the touch control screen. The cover 10 can be a cover glass, a PMMA (polymethyl methacrylate) glass, or a lens.

The fluorescent layer 12 is formed by printing fluorescent powder. The fluorescent powder stores optical energy when radiated with the natural light, fluorescent lamps, or ultraviolet light. After the light radiation is stopped, the optical energy is slowly released in the form of a fluorescent light. The fluorescent effect, which can last more than ten hours, can clearly be seen at night or in the dark. A novel appearance and a colorful effect at night can be obtained by printing the fluorescent layer 12 and the ink layer 11 on the structure of a touch control display device. By disposing the fluorescent layer 12 on a side of the ink layer 11, the light rays emitted by the fluorescent powder can directly transmit the cover 10 to the outside, maximizing the effect of the fluorescent powder and obtaining an obvious fluorescent effect. Application of the fluorescent powder and the ink can be achieved by printing, such as direct printing, heat transfer printing, hot embossing, or inkjet printing.

In a preferred embodiment shown in FIG. 2, the display module is in the form of a GFF structure (of course, the display module can be a GF structure). In the embodiment of GFF structure, the display module includes a first indium tin oxide film 16, a second indium tin oxide film 14, and a module bonding layer 15. The module bonding layer 15 is disposed between the first indium tin oxide film 16 and the second indium tin oxide 14 to bond the first indium tin oxide film 16 with the second indium tin oxide 14. The module bonding layer 15 uses an optically clear adhesive.

With reference to FIG. 3, in a second example for producing a display device, the method includes applying an ink on at least one end of a cover 10 to form an ink layer 11. Fluorescent powder is applied on the cover 10 at a location other than the ink layer 11, forming a fluorescent layer 12. The fluorescent layer 12 is contiguous to the ink layer 11. The thickness of each of the ink layer 11 and the fluorescent layer 12 is 5-7 μm. A bonding layer 13 is formed on the ink layer 11, the fluorescent layer 12, and the cover 10. A display module is provided and is coupled to the cover 10 via the bonding layer 13. The bonding layer 13 uses an optically clear adhesive. In a preferred example, the fluorescent powder is evenly mixed the ink, and the mixture is printed on an end of the cover 10 to form a mixture layer of the ink and the fluorescent powder. Such a mixing provision is more flexible, and different ratios of the ink to the fluorescent can be provided according to needs to provide different luminances. Thus, both the color and the luminance can be controlled.

The display module can be a display panel 17 that can be an In-cell panel (in which the touch control screen is mounted inside the display structure) or an On-cell panel (in which the touch control screen is mounted on the surface of the display structure). A polarizer can be mounted on the touch control screen. The cover 10 can be a cover glass, a PMMA (polymethyl methacrylate) glass, or a lens.

With reference to FIG. 4, the display module can be in the form of a GFF structure (of course, the display module can be a GF structure). In the embodiment of GFF structure, the display module includes a first indium tin oxide film 16, a second indium tin oxide film 14, and a module bonding layer 15. The module bonding layer 15 is disposed between the first indium tin oxide film 16 and the second indium tin oxide 14 to bond the first indium tin oxide film 16 with the second indium tin oxide 14. The module bonding layer 15 uses an optically clear adhesive.

The advantageous effects of the methods for producing a display device according to the present invention are that by adding fluorescent powder into the ink for printing purposes or by disposing the fluorescent layer 12 on the ink layer 11, the display device is provided with a novel appearance, and the colors can be different, providing colorful stimulation to people and increasing the fluorescent effect of the display device.

The total thickness of the ink layer 11 and the fluorescent layer 12 is 5-7 μm, greatly reducing the level difference of the ink layer 11. Bubbles are less likely to be generated during bonding. Thus, a thin bonding layer 13 can be used for bonding purposes. In practice, a bonding layer 13 with a thickness of only 50 μm is sufficient to perform bonding between structural layers without generating bubbles. Thus, the overall thickness of the display device is reduced accordingly to fulfill the demand of thinning and lighting of electronic products.

Although specific embodiments have been illustrated and described, numerous modifications and variations are still possible without departing from the scope of the invention. The scope of the invention is limited by the accompanying claims.

The invention claimed is:

1. A display device comprising a display module, a cover, and a bonding layer configured between the display module and the cover; wherein an ink layer and a fluorescent layer are disposed between at least a portion of the cover and the bonding layer.

2. The display device as claimed in claim 1, wherein the ink layer and the fluorescent layer overlap the same portion of the cover and the bonding layer, and the portion is toward an end of the cover and the bonding layer.

3. The display device as claimed in claim 2, wherein the fluorescent layer is disposed between the ink layer and the portion of the cover.

4. The display device as claimed in claim 3, wherein a total thickness of the ink layer and the fluorescent layer is 5-7 μm.

5. The display device as claimed in claim 1, wherein the ink layer is disposed on a first portion of the cover, the fluorescent layer is disposed on a second portion of the cover, and the first portion is different from the second portion.

6. The display device as claimed in claim 5, wherein each of the ink layer and the fluorescent layer has a thickness of 5-7 μm.

7. The display device as claimed in claim 1, wherein the display module includes a first indium tin oxide film, a second indium tin oxide film, and a module bonding layer disposed between the first indium tin oxide film and the second indium tin oxide.

8. The display device as claimed in claim 2, wherein the display module includes a first indium tin oxide film, a second indium tin oxide film, and a module bonding layer disposed between the first indium tin oxide film and the second indium tin oxide.

9. The display device as claimed in claim 3, wherein the display module includes a first indium tin oxide film, a second indium tin oxide film, and a module bonding layer disposed between the first indium tin oxide film and the second indium tin oxide.

10. The display device as claimed in claim 4, wherein the display module includes a first indium tin oxide film, a second indium tin oxide film, and a module bonding layer disposed between the first indium tin oxide film and the second indium tin oxide.

11. The display device as claimed in claim 5, wherein the display module includes a first indium tin oxide film, a second indium tin oxide film, and a module bonding layer disposed between the first indium tin oxide film and the second indium tin oxide.

12. The display device as claimed in claim 6, wherein the display module includes a first indium tin oxide film, a second indium tin oxide film, and a module bonding layer disposed between the first indium tin oxide film and the second indium tin oxide.

13. A method for producing a display device, comprising: applying a fluorescent layer on a portion of a cover;

applying an ink layer on the fluorescent layer;

forming a bonding layer on the ink layer and the cover; and coupling a display module to the cover via the bonding layer, such that the fluorescent layer and the ink layer are disposed between the portion of the cover and the display module.

14. The method as claimed in claim 13, wherein a total thickness of the ink layer and the fluorescent layer is 5-7 µm.

15. A method for producing a display device, comprising:

applying an ink layer and a fluorescent layer on separate portions of a cover;

forming a bonding layer on the ink layer, the fluorescent layer, and the cover; and coupling a display module to the cover via the bonding layer, such that the ink layer and the fluorescent layer are disposed between the portions of the cover and the display module.

16. The method as claimed in claim 15, wherein a thickness of each of the ink layer and the fluorescent layer is 5-7 µm.

* * * * *